(12) United States Patent
Boncha et al.

(10) Patent No.: US 9,817,991 B2
(45) Date of Patent: Nov. 14, 2017

(54) SYSTEM AND METHOD FOR A CLOUD BASED SOLUTION TO TRACK NOTES AGAINST BUSINESS RECORDS

(71) Applicant: NetSuite Inc., San Mateo, CA (US)

(72) Inventors: Chris Boncha, San Mateo, CA (US); Juan Camacho, San Mateo, CA (US); Wei (Michelle) Xue, Redwood City, CA (US); Rosalina Kessman, San Mateo, CA (US); Sam Rajkumar, San Mateo, CA (US); Johanne Lim, San Mateo, CA (US)

(73) Assignee: NETSUITE INC., San Mateo, CA (US)

( * ) Notice: Subject to any disclaimer, the term of this patent is extended or adjusted under 35 U.S.C. 154(b) by 89 days.

(21) Appl. No.: 14/708,031

(22) Filed: May 8, 2015

(65) Prior Publication Data

US 2017/0200018 A1    Jul. 13, 2017

Related U.S. Application Data

(60) Provisional application No. 61/990,533, filed on May 8, 2014.

(51) Int. Cl.
*H04L 29/06* (2006.01)
*G06F 21/62* (2013.01)
*G06Q 10/10* (2012.01)

(52) U.S. Cl.
CPC ........ *G06F 21/6218* (2013.01); *G06Q 10/10* (2013.01)

(58) Field of Classification Search
CPC .. G06F 21/6245; G06F 21/6218; G06F 21/10; G06F 21/6209; H04L 63/102
See application file for complete search history.

(56) References Cited

U.S. PATENT DOCUMENTS

| | | | | |
|---|---|---|---|---|
| 8,082,301 B2* | 12/2011 | Ahlgren | .................. | G06F 9/468 709/204 |
| 8,595,207 B2* | 11/2013 | McFarlane | ........ | G06F 17/30864 707/707 |
| 8,914,422 B2* | 12/2014 | Hale | .................. | G06F 17/30292 707/601 |
| 9,160,747 B2* | 10/2015 | Hotti | ........................ | H04L 63/10 |
| 9,436,515 B2* | 9/2016 | Pohlmann | ............. | G06F 9/5088 |
| 9,501,453 B2* | 11/2016 | Gasn | .................. | G06F 17/30893 |

(Continued)

*Primary Examiner* — Yonas Bayou
(74) *Attorney, Agent, or Firm* — Cooper Legal Group, LLC

(57) ABSTRACT

Systems, apparatuses, and methods for creating, editing and using notes within the context of a records database. In an embodiment, a user may create a virtual sticky note that is associated with an underlying record such that the note is displayed with the record but extraneous from any field in the business record. Further, not all notes may be seen by all users as various levels of privacy may be established for different users. Embodiments enable users to efficiently and effectively associate their comments or other inputs with a record or file that is maintained on a cloud-based or multi-tenant platform. The notes may be implemented is a cloud-based solution to track notes/comments against business records maintained on a multi-tenant platform. In one embodiment, a note creator may permit other users to specify rules or criteria that determine who or what portions of an organization may view the created notes.

19 Claims, 7 Drawing Sheets

(56) References Cited

U.S. PATENT DOCUMENTS

| | | | | |
|---|---|---|---|---|
| 9,547,665 B2* | 1/2017 | Wood | ............... | G06F 17/30165 |
| 9,661,143 B1* | 5/2017 | Okita | ................... | H04M 3/567 |
| 2003/0163547 A1* | 8/2003 | Beisty | ................... | G06Q 10/10 |
| | | | | 709/217 |
| 2011/0302133 A1* | 12/2011 | Kuruganti | ........ | G06F 17/30557 |
| | | | | 707/608 |
| 2012/0254957 A1* | 10/2012 | Fork | ...................... | G06F 21/33 |
| | | | | 726/6 |
| 2013/0218978 A1* | 8/2013 | Weinstein | ............ | H04L 65/403 |
| | | | | 709/205 |
| 2013/0318630 A1* | 11/2013 | Lam | ...................... | G06F 21/60 |
| | | | | 726/28 |

* cited by examiner

SYSTEM AND METHOD FOR A CLOUD BASED SOLUTION TO TRACK NOTES AGAINST BUSINESS RECORDS

PRIORITY CLAIM

This application claims the benefit of U.S. Provisional Application No. 61/990,533, entitled "A Cloud Based Solution to Track Notes against Business Records," filed May 8, 2014, which is incorporated by reference in its entirety herein for all purposes.

BACKGROUND

In a distributed-computing, multi-tenant platform, establishing common rules and procedures for users across all tenants can prove to be valuable from an efficient computing perspective. To this end, adding functionality to various program modules for tenant use proves to be a valuable addition in that such functionality typically scales well with a multi-tenant platform. In a multi-tenant platform, users may choose to keep business records in the context of typical enterprise-wide systems such as a customer-relationship management (CRM) system or an Enterprise Resource Planning (ERP) system.

In such enterprise-wide systems, it is common for users to want to generate comments, reminders, or other forms of secondary information and associate that information with a project, task, record, file, and the like. One way that people typically memorialize such secondary information is through use of a simple real-world solution (such as the well-known "post-it notes") to generate "reminders" or information about tasks or projects. Once created, such a user may then place the generated notes in physical proximity to a computer or workspace. However, this creates a cluttered working area and the notes are prone to being lost or damaged.

Various electronic/digital implementations of "sticky notes" exist, but there is no efficient way to link such documents to a record or file to which said documents pertain. This can make it difficult to associate a comment or suggestion with a specific file, record, or set of information. This situation can be especially frustrating when there are a group of people working in multiple locations (and hence potentially in multiple time zones) that need to be able to track each other's inputs during the development of a product or service in a way that clearly associates those inputs with the project or task they are working on. Conventional approaches to providing a solution to this problem are inefficient, ineffective, or suffer from other disadvantages.

BRIEF DESCRIPTION OF THE DRAWINGS

Aspects and many of the attendant advantages of the claims will become more readily appreciated as the same become better understood by reference to the following detailed description, when taken in conjunction with the accompanying drawings, wherein:

Note that the same numbers are used throughout the disclosure and figures to reference like components and features.

DETAILED DESCRIPTION

Figure 1:
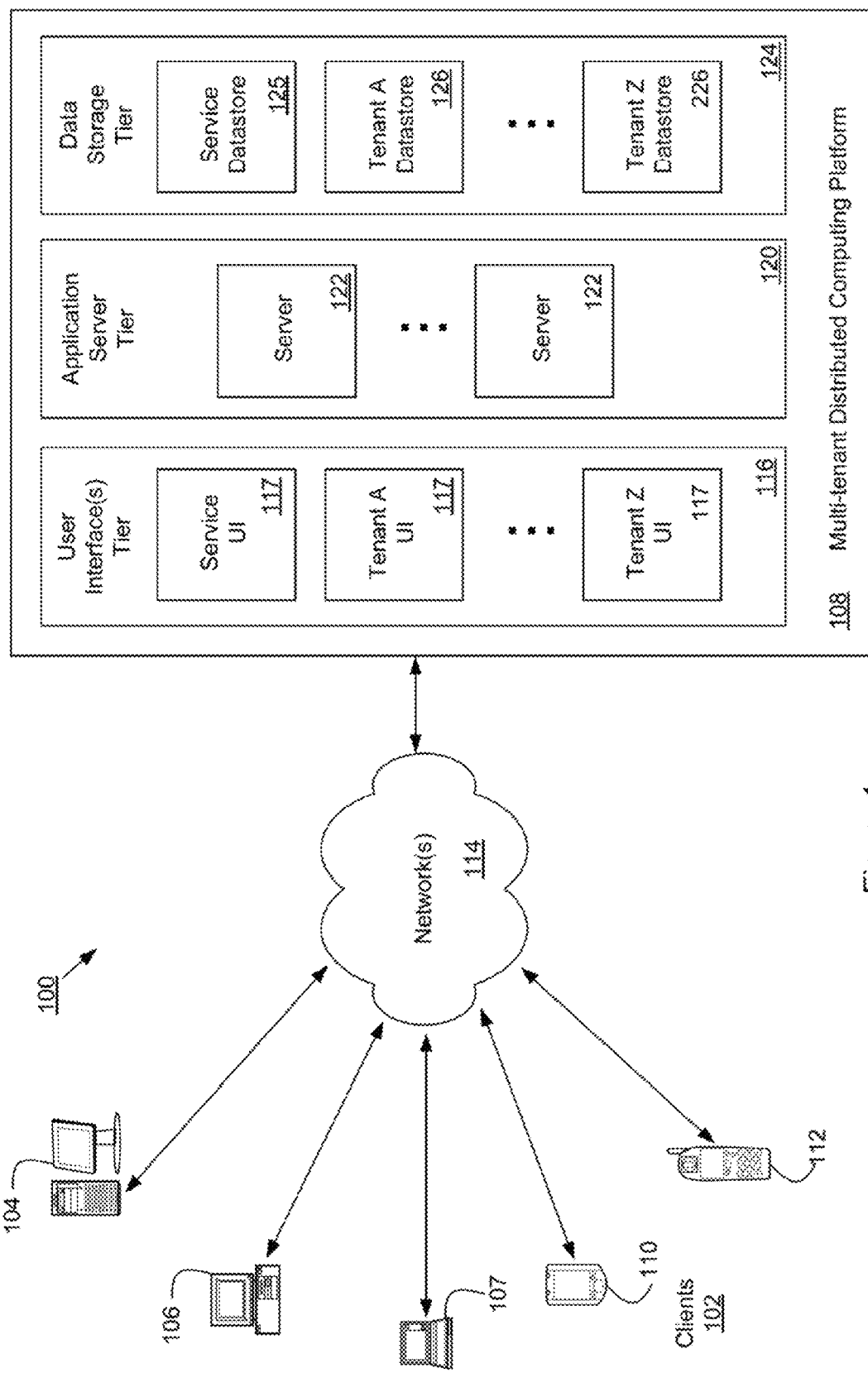
FIG. 1 is a diagram illustrating elements or components of an example operating environment in which an embodiment of the subject matter disclosed herein may be implemented.

The subject matter of embodiments disclosed herein is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments will be described more fully hereinafter with reference to the accompanying drawings, which form a part hereof, and which show, by way of illustration, exemplary embodiments by which the systems and methods described herein may be practiced. This systems and methods may, however, be embodied in many different forms and should not be construed as limited to the embodiments set forth herein; rather, these embodiments are provided so that this disclosure will satisfy the statutory requirements and convey the scope of the subject matter to those skilled in the art.

Among other things, the present subject matter may be embodied in whole or in part as a system, as one or more methods, or as one or more devices. Embodiments may take the form of a hardware implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, controller, etc.) that are part of a client device, server, network element, or other form of computing or data processing device/platform and that is programmed with a set of executable instructions (e.g., software instructions), where the instructions may be stored in a suitable non-transitory data storage element. In some embodiments, one or more of the operations, functions, processes, or methods described herein may be implemented by a specialized form of hardware, such as a programmable gate array, application specific integrated circuit (ASIC), or the like. The following detailed description is, therefore, not to be taken in a limiting sense.

In some embodiments, the subject matter may be implemented in the context of a multi-tenant, "cloud" based environment (such as a multi-tenant business data processing platform), typically used to develop and provide web services and business applications for end users. This exemplary implementation environment will be described with reference to FIGS. 1-6 below. Note that embodiments may also be implemented in the context of other computing or operational environments or systems, such as for an individual business data processing system, a private network used with a plurality of client terminals, a remote or on-site data processing system, another form of client-server architecture, etc.

Modern computer networks incorporate layers of virtualization so that physically remote computers and computer components can be allocated to a particular task and then reallocated when the task is done. Users sometimes speak in terms of computing "clouds" because of the way groups of computers and computing components can form and split responsive to user demand, and because users often never see the computing hardware that ultimately provides the computing services. More recently, different types of computing clouds and cloud services have begun emerging.

For the purposes of this description, cloud services may be divided broadly into "low level" services and "high level" services. Low level cloud services (sometimes called "raw" or "commodity" services) typically provide little more than virtual versions of a newly purchased physical computer system: virtual disk storage space, virtual processing power, an operating system, and perhaps a database such as an RDBMS. In contrast, high or higher level cloud services typically focus on one or more well-defined end user applications, such as business oriented applications. Some high level cloud services provide an ability to customize and/or extend the functionality of one or more of the end user applications they provide; however, high level cloud services typically do not provide direct access to low level computing functions.

The ability of business users to access crucial business information has been greatly enhanced by the proliferation of IP-based networking together with advances in object oriented Web-based programming and browser technology. Using these advances, systems have been developed that permit web-based access to business information systems, thereby allowing a user with a browser and an Internet or intranet connection to view, enter, or modify business information. For example, substantial efforts have been directed to Enterprise Resource Planning (ERP) systems that integrate the capabilities of several historically separate business computing systems into a common system, with a view toward streamlining business processes and increasing efficiencies on a business-wide level. By way of example, the capabilities or modules of an ERP system may include (but are not required to include, nor limited to only including): accounting, order processing, time and billing, inventory management, retail point of sale (POS) systems, eCommerce, product information management (PIM), demand/material requirements planning (MRP), purchasing, content management systems (CMS), professional services automation (PSA), employee management/payroll, human resources management, and employee calendaring and collaboration, as well as reporting and analysis capabilities relating to these functions.

In a related development, substantial efforts have also been directed to integrated Customer Relationship Management (CRM) systems, with a view toward obtaining a better understanding of customers, enhancing service to existing customers, and acquiring new and profitable customers. By way of example, the capabilities or modules of a CRM system can include (but are not required to include, nor limited to only including): sales force automation (SFA), marketing automation, contact list, call center support, returns management authorization (RMA), loyalty program support, and web-based customer support, as well as reporting and analysis capabilities relating to these functions. With differing levels of overlap with ERP/CRM initiatives and with each other, efforts have also been directed toward development of increasingly integrated partner and vendor management systems, as well as web store/eCommerce, product lifecycle management (PLM), and supply chain management (SCM) functionality.

As discussed in the background, in order to ensure a consistent quality of service for the tenants, a multi-tenant, distributed, computing platform (hereinafter, platform) may need to restrict the ability of one operation to consume excessive resources to the detriment of other operations that are executing at the same time (where the resources in question are primarily processing (CPU) time and memory (RAM)). One possible approach to this problem is to begin a timer upon when a data processing operation begins and to simply terminate the operation if and when the timer expires. While this would prevent excessive use of resources, the approach has multiple drawbacks: it does not restrict access to RAM; it penalizes operations (e.g., scripts) that spend time waiting for an external result to be returned (during which time they are not utilizing any CPU time); and terminating the operation of a single operation in a multi-threaded application requires the system to be built with termination in mind (which is difficult for the platform and not enforceable for any customized operations that may run on top of the platform if the platform is flexible).

Another possible approach is to run a separate instance of the platform for each tenant/customer, wherein each instance includes process-wide resource limits set to prevent interference with other instances that may be executing using the same computing resources. This makes each instance substantially equivalent to a single-tenant platform, thereby negating many of the benefits of multi-tenant platforms, including reduced hardware and management overhead. These solutions have drawbacks as are evident in the discussion below with regard to embodiments of the subject disclosed next and in particular with regard to tenants/customer who may wish to customize operations to meet specific needs.

By way of overview, the subject matter disclosed herein is directed to systems, apparatuses, and methods for creating, editing and using notes within the context of a records database. In this manner, a user may create a note that is associated with an underlying record such that the note is displayed with the record but extraneous from any field in the business record. Further, not all notes may be seen by all users as various levels of privacy may be established for different users. Embodiments enable users to efficiently and effectively associate their comments or other inputs with a record or file that is maintained on a cloud-based or multi-tenant platform.

In one embodiment, an improvement to the operation of a multi-tenant computing platform provides for increased versatility in storing records and manipulating records across an enterprise with multiple users who have access the records. Thus, the improved multi-tenant computing platform includes a records application module configured to store records in a tenant data store such that each record includes typical business record data stored therein. Further, the platform provides for a graphical user interface configured to display a graphical representation of the data associated with one or more records. Such access is typically restricted to a first set of one or more credentialed users (e.g., users who are authorized to view and manipulate the records). The platform further includes a notes application module configured to facilitate generation of one or more notes associated with one or more records in the tenant data store. Each note may further include restricted access such that only a second set of one or more credentialed users may access the note. The second set of credentialed users may be different from the first set, such as for example, only executives may have access to note whereas an entire accounting department may have access to the underlying associated records.

In one embodiment, the notes may be implemented is a cloud-based solution to track notes/comments against business records maintained on a multi-tenant platform. In one embodiment, a note creator may permit other users to specify rules or criteria that determine who or what portions of an organization may view the created notes. As noted, it is common for users to track important business information offline in the form of a physical note. One goal of the disclosed aspects is, therefore, to enable users to capture this business information online and associate it to the relevant records in their account. Other objects and advantages of the present subject matter will be apparent to one of ordinary skill in the art upon review of the detailed description of the specification and the included figures.

FIG. 1 is a diagram illustrating elements or components of an example operating environment in which an embodiment may be implemented. In FIG. 1, an example operating environment 100 includes a variety of clients 102 incorporating and/or incorporated into a variety of computing devices that may communicate with a distributed computing service/platform 108 through one or more networks 114. For example, a client may incorporate and/or be incorporated into a client application (e.g., software) implemented at least in part by one or more of the computing devices. Examples of suitable computing devices include personal computers, server computers 104, desktop computers 106, laptop computers 107, notebook computers, tablet computers or personal digital assistants (PDAs) 110, smart phones 112, cell phones, and consumer electronic devices incorporating one or more computing device components, such as one or more electronic processors, microprocessors, central processing units (CPU), or controllers. Examples of suitable networks 114 include networks utilizing wired and/or wireless communication technologies and networks operating in accordance with any suitable networking and/or communication protocol (e.g., the Internet).

The distributed computing service/platform (which may also be referred to as a multi-tenant business-data-processing platform) 108 may include multiple processing tiers, including a user interface tier 116, an application server tier 120, and a data storage tier 124. The user interface tier 116 may maintain multiple user interfaces 117, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs). The default user interface may include components enabling a tenant to administer the tenant's participation in the functions and capabilities provided by the service platform, such as accessing data, causing the execution of specific data processing operations, and the like. Each processing tier shown in FIG. 1 may be implemented with a set of computers and/or computer components including computer servers and processors, and may perform various functions, methods, processes, or operations as determined by the execution of a software application or set of instructions. The data storage tier 124 may include one or more data stores, which may include a service data store 125 and one or more tenant data stores 126.

Each tenant data store 126 may contain tenant-specific data that is used as part of providing a range of tenant-specific business services or functions, including but not limited to ERP, CRM, eCommerce, Human Resources management, payroll, and the like. Data stores may be implemented with any suitable data storage technology, including structured query language (SQL) based relational database management systems (RDBMS).

In accordance with one embodiment, the distributed computing service/platform 208 may be a multi-tenant and service platform 108 and may be operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information.

As noted, such business information systems may include an ERP system that integrates the capabilities of several historically separate business computing systems into a common system, with the intention of streamlining business processes and increasing efficiencies on a business-wide level. By way of example, the capabilities or modules of an ERP system may include (but are not required to include, nor limited to only including): accounting, order processing, time and billing, inventory management, retail point of sale (POS) systems, eCommerce, product information management (PIM), demand/material requirements planning (MRP), purchasing, content management systems (CMS), professional services automation (PSA), employee management/payroll, human resources management, and employee calendaring and collaboration, as well as reporting and analysis capabilities relating to these functions. Such functions or business applications are typically implemented by one or more modules of software code/instructions that are maintained on and executed by one or more servers 122 that are part of the platform's Application Server Tier 120.

Another business information system that may be provided as part of an integrated data processing and service platform is an integrated CRM system, which is designed to assist in obtaining a better understanding of customers, enhance service to existing customers, and assist in acquiring new and profitable customers. By way of example, the capabilities or modules of a CRM system can include (but are not required to include, nor limited to only including): sales force automation (SFA), marketing automation, contact list, call center support, returns management authorization (RMA), loyalty program support, and web-based customer support, as well as reporting and analysis capabilities relating to these functions. In addition to ERP and CRM functions, a business information system/platform (such as element 108 of FIG. 1) may also include one or more of an integrated partner and vendor management system, eCommerce system (e.g., a virtual storefront application or platform), product lifecycle management (PLM) system, Human Resources management system (which may include medical/dental insurance administration, payroll, and the like), or supply chain management (SCM) system. Such functions or business applications are typically implemented by one or more modules of software code/instructions that are maintained on and executed by one or more servers 122 that are part of the platform's Application Server Tier 120.

Note that both functional advantages and strategic advantages may be gained through the use of an integrated business system comprising ERP, CRM, and other business capabilities, as for example where the integrated business system is integrated with a merchant's eCommerce platform and/or "web-store." For example, a customer searching for a particular product can be directed to a merchant's website and presented with a wide array of product and/or services from the comfort of their home computer, or even from their mobile phone. When a customer initiates an online sales transaction via a browser-based interface, the integrated business system can process the order, update accounts receivable, update inventory databases and other ERP-based systems, and can also automatically update strategic customer information databases and other CRM-based systems. These modules and other applications and functionalities may advantageously be integrated and executed by a single code base accessing one or more integrated databases as necessary, forming an integrated business management system or platform.

The integrated business system shown in FIG. 1 may be hosted on a distributed computing system made up of at least one, but typically multiple, "servers." A server is a physical computer dedicated to run one or more software services intended to serve the needs of the users of other computers in data communication with the server, for instance via a public network such as the Internet or a private "intranet" network. The server, and the services it provides, may be referred to as the "host" and the remote computers and the software applications running on the remote computers may be referred to as the "clients." Depending on the computing service that a server offers it could be referred to as a database server, file server, mail server, print server, web server, and the like. A web server is a most often a combination of hardware and the software that helps deliver content (typically by hosting a website) to client web browsers that access the web server via the Internet.

Rather than build and maintain such an integrated business system themselves, a business may utilize systems provided by a third party. Such a third party may implement an integrated business system as described above in the context of a multi-tenant platform, wherein individual instantiations of a single comprehensive integrated business system are provided to a variety of tenants. However, one challenge in such multi-tenant platforms is the ability for each tenant to tailor their instantiation of the integrated business system to their specific business needs. In one embodiment, this limitation may be addressed by abstracting the modifications away from the codebase and instead supporting such increased functionality through custom transactions as part of the application itself. Prior to discussing additional aspects of custom transactions, additional aspects of the various computing systems and platforms are discussed next with respect to FIG. 2.

Figure 2:
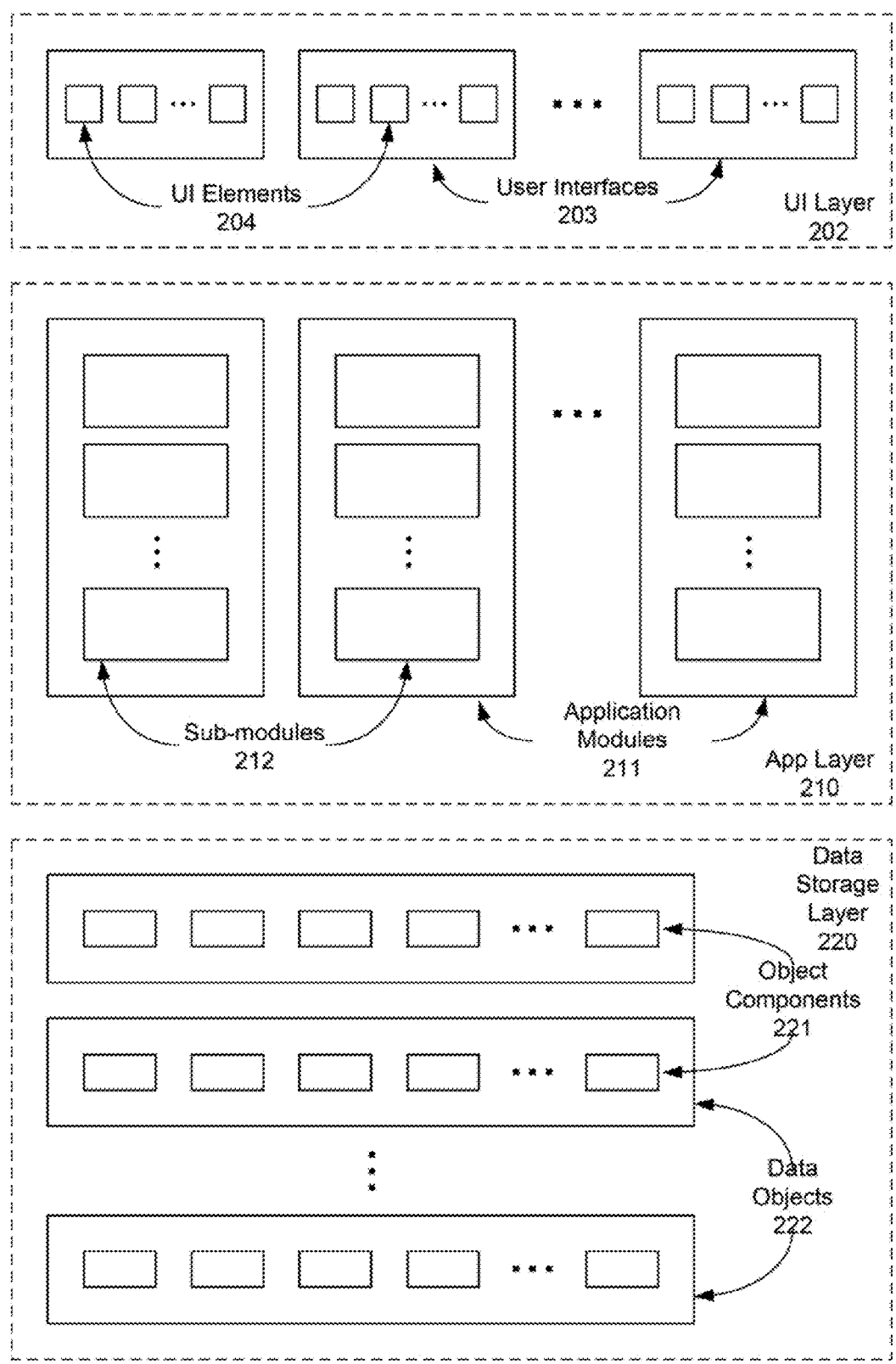
FIG. 2 is a diagram illustrating additional details of the elements or components of the multi-tenant distributed computing service platform of FIG. 1, in which an embodiment of the subject matter disclosed herein may be implemented.

FIG. 2 is a diagram illustrating additional details of the elements or components of the distributed computing service platform of FIG. 1, in which an embodiment may be implemented. The software architecture depicted in FIG. 2 represents an example of a complex software system to which an embodiment may be applied. In general, an embodiment may be applied to any set of software instructions embodied in one or more non-transitory, computer-readable media that are designed to be executed by a suitably programmed processing element (such as a CPU, microprocessor, processor, controller, computing device, and the like). In a complex system such instructions are typically arranged into "modules" with each such module performing a specific task, process, function, or operation. The entire set of modules may be controlled or coordinated in their operation by an operating system (OS) or other form of organizational platform.

In FIG. 2, various elements or components 200 of the multi-tenant distributed computing service platform of FIG. 1 are shown, in which an embodiment may be implemented. The example architecture includes a user interface layer or tier 202 having one or more user interfaces 203. Examples of such user interfaces include graphical user interfaces and application programming interfaces (APIs). Each user interface may include one or more interface elements 204. For example, users may interact with interface elements in order to access functionality and/or data provided by application and/or data storage layers of the example architecture. Examples of graphical user interface elements include buttons, menus, checkboxes, drop-down lists, scrollbars, sliders, spinners, text boxes, icons, labels, progress bars, status bars, toolbars, windows, hyperlinks and dialog boxes. Application programming interfaces may be local or remote, and may include interface elements such as parameterized procedure calls, programmatic objects and messaging protocols.

The application layer 210 may include one or more application modules 211, each having one or more sub-modules 212. Each application module 211 or sub-module 312 may correspond to a particular function, method, process, or operation that is implemented by the module or sub-module (e.g., a function or process related to providing ERP, CRM, eCommerce or other functionality to a user of the platform). Such function, method, process, or operation may also include those used to implement one or more aspects of the inventive system and methods, such as for:

providing a user interface to a user to enable the user to create a note or comment and associate that note or comment with a specific record or file;

providing a user interface to a user to enable the user to specify the access controls on the created note or comment (e.g., public, private, or to define a set of criteria or rules that determine who has access to the note or comment when viewing the associated record or file; and providing a user interface to a user to enable the user to review, edit, or delete a note or comment created by the user.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. Each application server (e.g., as represented by element 122 of FIG. 2) may include each application module. Alternatively, different application servers may include different sets of application modules. Such sets may be disjoint or overlapping.

The data storage layer 220 may include one or more data objects 222 each having one or more data object components 221, such as attributes and/or behaviors. For example, the data objects may correspond to tables of a relational database, and the data object components may correspond to columns or fields of such tables. Alternatively, or in addition, the data objects may correspond to data records having fields and associated services. Alternatively, or in addition, the data objects may correspond to persistent instances of programmatic data objects, such as structures and classes. Each data store in the data storage layer may include each data object. Alternatively, different data stores may include different sets of data objects. Such sets may be disjoint or overlapping.

Figure 3:
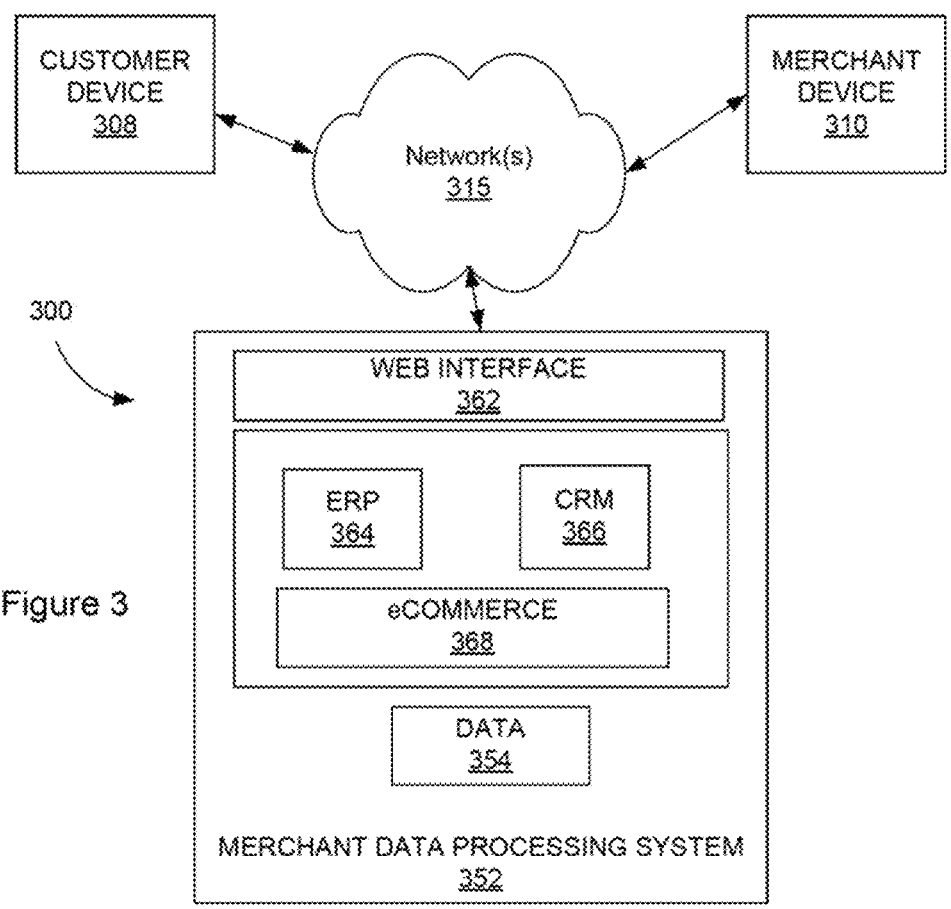
FIG. 3 is a diagram illustrating a simplified system of FIG. 1, including an integrated business system and an enterprise network in which an embodiment of the subject matter disclosed herein may be implemented.

FIG. 3 is a diagram illustrating another perspective of a computing or data processing environment 300 in which an embodiment may be implemented. FIG. 3 illustrates a merchant's data processing system 352, where such a platform or system may be provided to and operated for the merchant by the administrator of a multi-tenant business data processing platform. Thus, the merchant may be a tenant of such a multi-tenant platform, with the elements that are part of system 352 being representative of the elements in the data processing systems available to other tenants. The merchant's data is stored in a data store 354, thereby permitting customers and employees to have access to business data and information via a suitable communication network or networks 315 (e.g., the Internet). Data store 354 may be a secure partition of a larger data store that is shared by other tenants of the overall platform.

A user of the merchant's system 352 may access data, information, and applications (i.e., business related functionality) using a suitable device or apparatus, examples of which include a customer computing device 308 and/or the Merchant's computing device 310. In one embodiment, each such device 308 and 310 may include a client application such as a browser that enables a user of the device to generate requests for information or services that are provided by system 352. System 352 may include a web interface 362 that receives requests from users and enables a user to interact with one or more types of data and applications (such as ERP 364, CRM 366, eCommerce 368, or other applications that provide services and functionality to customers or business employees).

Note that the example computing environments depicted in FIGS. 1-3 are not intended to be limiting examples. Alternatively, or in addition, computing environments in which embodiments may be implemented include any suitable system that permits users to access, process, and utilize data stored in a data storage element (e.g., a database) that can be accessed remotely over a network. Although further examples below may reference the example computing environment depicted in FIGS. 1-3, it will be apparent to one of skill in the art that the examples may be adapted for alternate computing devices, systems, and environments.

Figure 4:
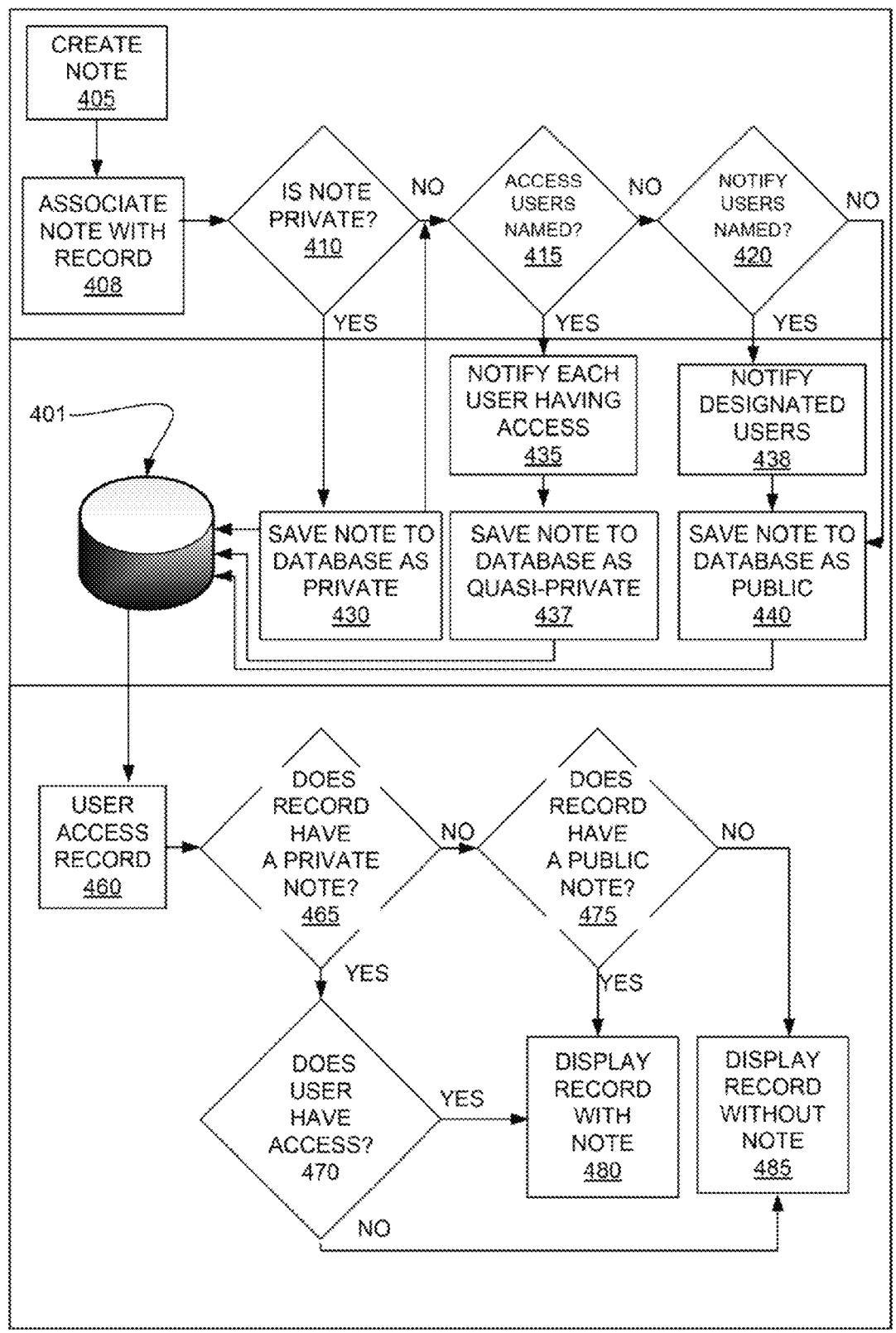
FIG. 4 is a flow chart or flow diagram illustrating a process, method, operation, or function for creating an electronic "note" and setting the access rights for the note, and that may be used when implementing an embodiment of the subject matter discussed herein.

FIG. 4 is a flow chart or flow diagram illustrating a process, method, operation, or function for creating an electronic "note" (simply referred to as note, hereinafter) and setting the access rights for the note, and that may be used when implementing an embodiment of the invention. FIG. 4 further illustrates how the note created by a user is associated with a record or file that is maintained on a cloud-based or multi-tenant platform in either a public or private setting. The flow chart is generally divided into three sections, a first section at the top detailing actions by a creator of a note, a second section in the middle detailing aspects of the storage of the created note at a database and a third section at the bottom detailing actions of a user that may access various notes that have been created. These distinctions are merely for ease of illustration and not intended to be a limiting feature of the underlying ideas described herein.

Turning attention to the first section of FIG. 4, a user may choose to create a new note at step 405. The creation of a note may typically be accomplished through a graphical user interface (GUI) executing at a computer in which the creating user is operating. Aspects of such a GUI are described below with respect to FIG. 5. As a user creates a note, any type of information may typically be stored in the context of the note itself. For example, a user may wish to indicate that a specific business record has yet to be completed and may choose to create a note that is associated with the business record. The created note, which may appear on a display of the associated record in the form of an image of an actual "sticky note" may include text therein that was written by the creator in indicate that which the creator wished to convey, e.g., "this record needs to be completed." Several other examples are discussed below, but for now, the next steps in FIG. 4 are discussed.

After creating the note, the user may then associate the newly created note with an existing record in a database 401 or create a new record for storage in the database 401 at step 408. That is, once initially created 914 or saved, the note is then associated with at least one record in the database 401. In some embodiments, the newly created note may be associated with more than one record in the database. After association, and before saving the actual note to the database, the user may further designate access rights to view the note such that the note will have restricted access different from any restricted access of the associated record. At step 410, the user may designate the note as being private or public. If the note is designated as private, no other user (other than the creator) may view the note in a computer display of the record. Other users may still view the underlying record, but the note will be private and only viewable by the creator. As such, the note now designated as private is the stored in the database 401 at step 430. Further, a credentials application module may be updated to indicate that only the creator has credentials to view or manipulate the restricted-access note.

The designation as a private note may later be changed by the creator such that the note may deemed public and stored in the database as simply a public note that is part of the public record. In other embodiments, the creator may designate other users as having access to the private note. Therefore, after storing a note designated as private, the method loops back to another decision point for the creator at step 415. If the creator did not designate the note as private (e.g., the note is simply public or quasi-public), the decision point at step 415 is also reached.

At step 415, the creator may designate additional users to grant access to view the note. Thus, if the creator does designate the note initially as private, additional users that the creator identifies may be granted access to view the now quasi-public note. That is, the designation of additional users to have access to the private note changes the private note into a quasi-public note whereby the creator and designated users at step 415 may view the note along with the record. Once designated as a user that has access, a communication (e.g., an email, a text message, and the like) may be generated and sent to each user designated as such at step 435 and the now quasi-public note may be stored in the database 401 as such at step 437. Further, a credentials application module may be updated to indicate the access to the note for the designated users.

If the creator does not designate specific users to have access at step 415 and the creator did not designate the note as private at step 410, then the note is presumed to be a public note. At step 420, the creator may still designate specific users to receive a communication that the public note exists. Thus at step 428, the users designated at step 420 may be sent a communication alerting said designated users to the existence of the public note. Further, the public note is then stored in the database 401 at step 440.

As notes are stored in the database 401, various users may access various records in the database 401. If a record to be displayed to a user includes a note of any kind, additional method steps may be followed to determine whether or not the accessing user may also see the note that was created and stored associated with the record being accessed. Thus, at step 460, a user (who may or may not be a creator of a note associated with a record) may access a record in the database 401.

As the user accesses a record, a first decision step 465 determines whether or not there exists a private or quasi-private note associated with the record. If there is a private note, a next decision point 470 is reached wherein it is determined as to whether the user has access to view the note. In the case of a private note, if the user is also the creator, then the user/creator does have access and the note is displayed along with the record at step 480. If there is a quasi-public note, the same next decision point 470 is reached wherein it is still determined as to whether the user has access to view the note. In the case of a quasi-public note, if the user is also the creator, then the user/creator does have access and the note is displayed along with the record at step 480. Further if the user is not the creator, the user may still have access to the note is the creator designated the user as having access at step 415 in which case the record is still displayed with the quasi-public note at step 480. If the user is not the creator and is not designated as having access to a quasi-public note, then the record is displayed without any note at step 485.

If there is no private or quasi-public note, then the method moves to decision point 475 where the method determines whether a public note exists. If there is a public note associated with the record, then the record is displayed with the note at step 480. If no public note exists, then the record is also displayed without any note at step 485.

Figure 5:
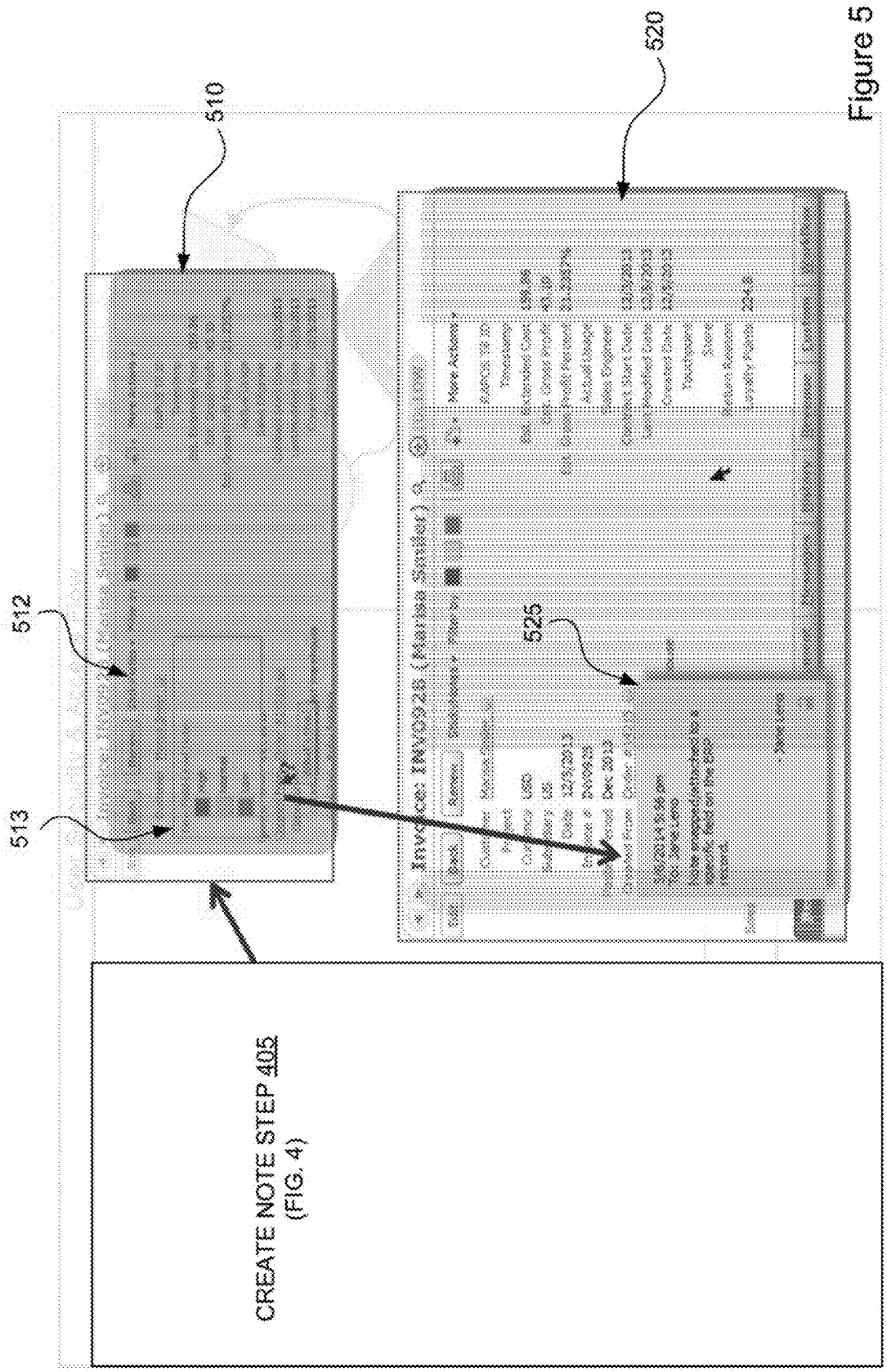
FIG. 5 is a diagram illustrating how the "note" created by a user is associated with a record or file that is maintained on a cloud-based or multi-tenant platform according to an embodiment of the subject matter discussed herein.

FIG. 5 is a diagram illustrating how a note may be created by a user and then associated with a record or file that is maintained on a cloud-based or multi-tenant platform according to an embodiment. In FIG. 5, the note creation step 405 of FIG. 4 is shown with additional details in conjunction with screen shots showing a suitable GUI for assisting a user/creator with the creation of a note.

In a typical manner, a record 510 from a database may be displayed via the GUI. For example, the record 510 (as displayed in a top portion of FIG. 5) shows data stored in the record regarding a specific invoice. A note creator may engage a sticky note drop down menu 512 which may then open a selection box 513 whereby the creator may select a specific kind of note to create. In this embodiment, the creator may choose from one of three notes having different priorities: high, normal, and low. In embodiments, these differently-prioritized notes may also be displayed as having different colors. For example, high priority may be red, normal priority may be yellow and low priority may be green. Such priority designation may be stored and manipulated via a sub-module of the notes application module, for example a notes priority application sub-module.

When a creator selects a specific priority note to create, a new note is then displayed on the GUI. This is shown on the second screen shot 520 of FIG. 5 below the GUI display 510. In this screen shot 520, one can see a new note 525 created. The new note may be a normal priority and be displayed as yellow. Further, the creator may populate the note with specific information desired and save the note to the database in manner described above with respect to FIG. 4. Thus, for users who are credentialed to see the note, the record will be displayed with such a note as shown in the screen shot 520 of FIG. 5.

In another embodiment, a creator of a note may add a new note to specific fields in a record. To accomplish this, a creator may hover a cursor of a pointing device, such as a mouse, over a field label of a displayed record. When a tooltip appears, the creator may again select a specific priority note to create. Field-level notes will be displayed below the field where the note is currently attached. If the field is hidden, the note will be displayed on the upper right portion of the page.

When a creator is presented with choices for creating notes, additional display features may be present. For example, on a button click, a drop down window may be displayed wherein each selectable option for a note is shown as an icon that simulates a pad of sticky notes. Further, on an icon hover, the top sticky note tilts simulating lifting it from the pad of sticky notes. Further yet, on a click, the top sticky note 'flies' toward at the center of the screen where the note becomes a data entry popup window. As the creator of notes begins to create several notes, a note board application module may be used to display all notes simultaneously and independent of any associated record. This is described next with respect to FIG. 6.

Figure 6:
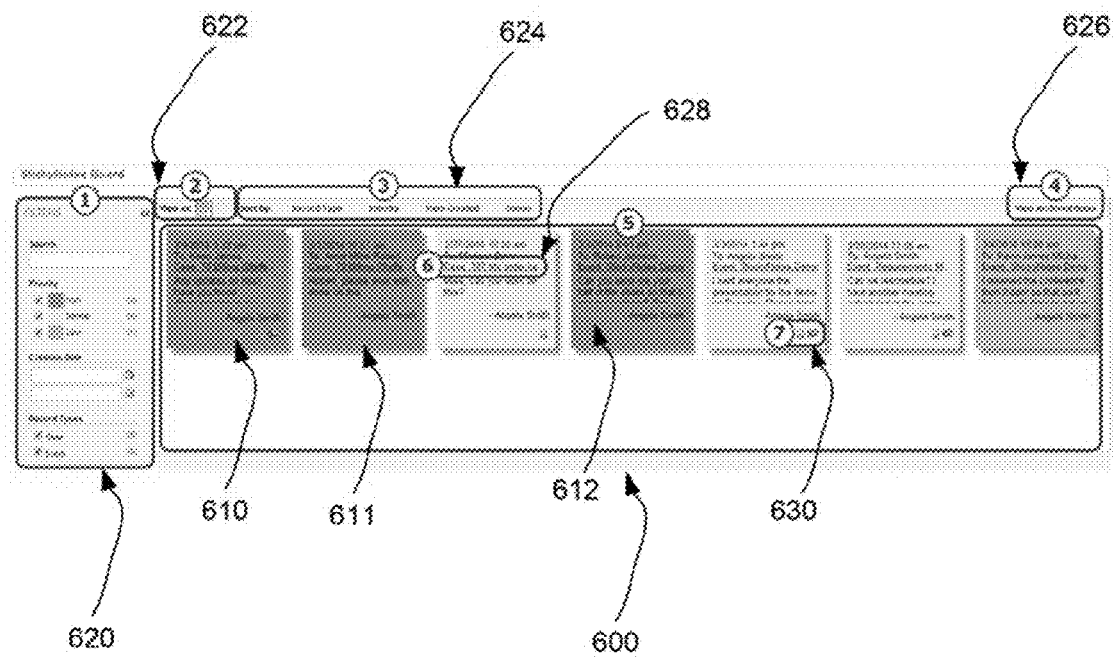
FIG. 6 is a diagram illustrating a note board of notes created by a user maintained on a cloud-based or multi-tenant platform according to an embodiment of the subject matter discussed herein.

FIG. 6 is a diagram illustrating a note board 600 of notes created by a user maintained on a cloud-based or multi-tenant platform according to an embodiment of the subject matter discussed herein. In this embodiment, notes having some manner of commonality may be displayed in a single display of notes. In this example, all notes created by a single user may be displayed such as notes 610, 611, and 612. In other embodiments, the notes displayed may be all notes in which a user has access to, whether the user was the creator or otherwise. The user may further filter the display using a filter selection tool 620 to display specific kinds of notes, such as only specific priority notes of notes having a creation date within a specified range. The filtered results may be further sorted using a sort tool 624 according to one or more specified criteria by the user of the note board 600.

The user may have available a view manipulation tool 622 for changing the view of the notes on the note board 600, for example, list, grid, and the like. The user may have further tools available for manipulating various notes such as marking notes as read, replying to creators or editors of notes, forwarding notes to new users with permission, compiling notes into a single note, and deleting or archiving notes. Archived notes may be viewed by selecting an archived note tool 626.

Notes themselves may also have additional features therein. For example, each note may include a record link 628 whereby a user may select the record link and have the associated record for a note on the note board displayed. Further, additional icon indicators 630 may be present for each note. These indicators may include one or more icons representing that the note is set to private, that the note is set to quasi-public, and that the note has been set to public.

The various features of the sticky note systems and methods and note boards as described above provide advantages over conventional systems and methods. For example, the capability for a user/creator of a note to attach notes to specific business records, such as customers, opportunities, etc., provides a convenient and simple way to track extraneous data outside of fields in a business record in a database. Further, having a flexible note keeping system allows for the ability to attach notes to specific fields on a form. In a related manner, a user may further visually snap notes to subform/sublist elements of a form, and then display notes back in a main form by default. Further, a user who has access to the note may assimilate the data stored in the note into a field in the associated record by clicking an assimilation button or by using a drag and drop manipulation. Further yet, creators and editors of notes can send email alerts to recipients by explicitly adding recipients' names to the notes. Such email alerts may also contain a summary of the note message itself, as well as a direct link to the associated record.

Figure 7:
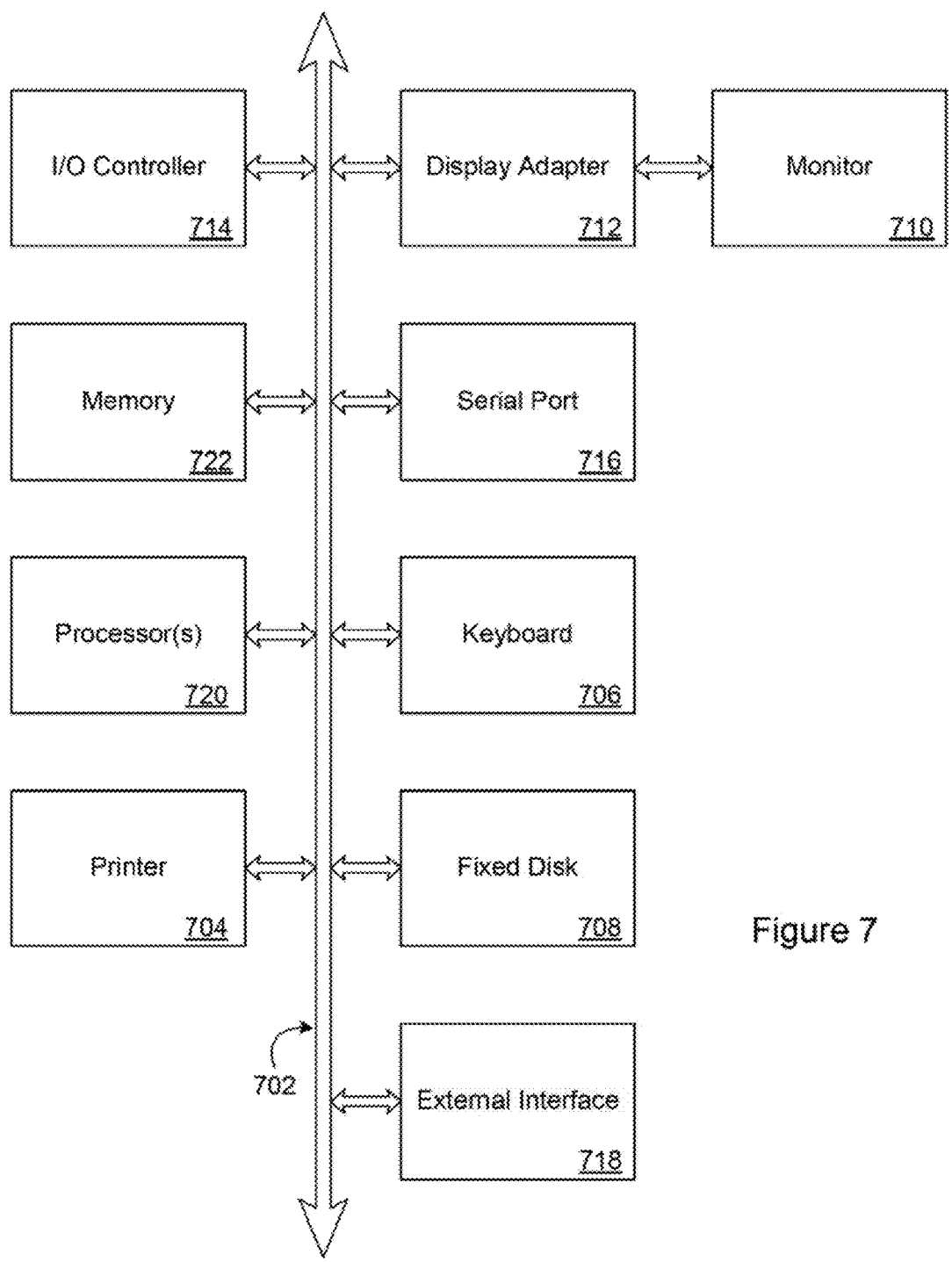
FIG. 7 is a diagram illustrating elements or components that may be present in a computer device or system configured to implement a method, process, function, or operation in accordance with an embodiment of the subject matter discussed herein.

In accordance with one embodiment, the system, apparatus, methods, processes, functions, and/or operations for enabling efficient configuration and presentation of a user interface to a user based on the user's previous behavior may be wholly or partially implemented in the form of a set of instructions executed by one or more programmed computer processors such as a central processing unit (CPU) or microprocessor. Such processors may be incorporated in an apparatus, server, client or other computing or data processing device operated by, or in communication with, other components of the system. As an example, FIG. 7 is a diagram illustrating elements or components that may be present in a computer device or system 700 configured to implement a method, process, function, or operation in accordance with an embodiment of the invention. The subsystems shown in FIG. 7 are interconnected via a system bus 702. Additional subsystems include a printer 704, a keyboard 706, a fixed disk 708, and a monitor 710, which is coupled to a display adapter 712. Peripherals and input/output (I/O) devices, which couple to an I/O controller 714, can be connected to the computer system by any number of means known in the art, such as a serial port 716. For example, the serial port 716 or an external interface 718 can be utilized to connect the computer device 700 to further devices and/or systems not shown in FIG. 7 including a wide area network such as the Internet, a mouse input device, and/or a scanner. The interconnection via the system bus 702 allows one or more processors 720 to communicate with each subsystem and to control the execution of instructions that may be stored in a system memory 722 and/or the fixed disk 708, as well as the exchange of information between subsystems. The system memory 722 and/or the fixed disk 708 may embody a tangible computer-readable medium.

It should be understood that the present disclosures as described above can be implemented in the form of control logic using computer software in a modular or integrated manner. Based on the disclosure and teachings provided herein, a person of ordinary skill in the art will know and appreciate other ways and/or methods to implement the present disclosure using hardware and a combination of hardware and software.

Any of the software components, processes or functions described in this application may be implemented as software code to be executed by a processor using any suitable computer language such as, for example, Java, Javascript, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments and does not pose a limitation to the scope of the disclosure unless otherwise claimed. No language in the specification should be construed as indicating any non-claimed element as essential to each embodiment of the present disclosure.

Different arrangements of the components depicted in the drawings or described above, as well as components and steps not shown or described are possible. Similarly, some features and sub-combinations are useful and may be employed without reference to other features and sub-combinations. Embodiments have been described for illustrative and not restrictive purposes, and alternative embodiments will become apparent to readers of this patent. Accordingly, the present subject matter is not limited to the embodiments described above or depicted in the drawings, and various embodiments and modifications can be made without departing from the scope of the claims below.

What is claimed is:

1. A method for improving the operation of a computer system, the method comprising:

creating a data record having data that can be accessed by credentialed users of a multi-tenant computing system;

establishing restricted access for the created record and storing the restricted-access record in a tenant data store in the multi-tenant computing system such that a first subset of the credentialed users of the multi-tenant computing system may access the restricted-access record;

accessing the restricted-access record stored in the tenant data store using access credentials of a user in the first subset of users;

generating a note associated with the record, the note having restricted access that is different from the restricted access of the record that corresponds to a second subset of the credentialed users of the multi-tenant computing system;

accessing the restricted-access record using access credentials of a user in the second subset; and displaying the record on the display with the note displayed over the record if the access credentials allow for access to both the restricted-access record and the note.

2. The method of claim 1, wherein the restricted access of the record comprises a restriction of access to users of the tenant data store who have the access credentials corresponding to the record.

3. The method of claim 1, wherein the restricted access of the note comprises a restriction of access to users of the tenant data store who have the access credentials assigned by a note generating user.

4. The method of claim 1, further comprising:
accessing the note after the note is generated; and
changing the restricted access of the note.

5. The method of claim 1, further comprising generating a communication to be sent to users who are designated as having access to the restricted-access note.

6. The method of claim 1, further comprising:
associating the generated note with a creator; and
displaying all notes created by the creator on a note board display.

7. The method of claim 1, wherein the display of the note comprises a color associated with a priority of the note.

8. The method of claim 1, wherein the display of the note comprises text data entered at the time of the creation of the note.

9. The method of claim 1, further comprising actuating an assimilation command that causes data stored in the note to be entered into a field of the associated record.

10. A multi-tenant computing platform, comprising:
a records application configured to store records in a tenant data store; each record having record data stored therein;
a graphical user interface configured to display a graphical representation of data associated with one or more records such that the display is restricted to a first set of one or more credentialed users; and
a notes application configured to facilitate generation of a note associated with one or more records in the tenant data store, each note having restricted access such that only a second set of one or more credentialed users may access the note, the second set different from the first set;
wherein the graphical user interface is configured to display a note over a record if and only if a credentialed user of the graphical user interface is in the first set of one or more credentialed users and in the second set of one or more credentialed users.

11. The multi-tenant computing platform of claim 10, further comprising a credentials application configured to store credentials data for users wherein users may have credentials associated with access to notes.

12. The multi-tenant computing platform of claim 10, further comprising a note board application configured to display one or more notes without respectively associated records.

13. The multi-tenant computing platform of claim 10, further comprising a note priority application configured to store a designated priority for each note.

14. The multi-tenant computing platform of claim 10, wherein the records stored in the tenant data store comprises business records for an enterprise resource planning system.

15. The multi-tenant computing platform of claim 10, wherein the records stored in the tenant data store comprises business records for a customer relationship management system.

16. A non-transitory computer-readable medium having computer executable instructions to improve operation of a multi-tenant computing platform, the instructions comprising:
facilitating creation of a data record having data that can be accessed by credentialed users of a multi-tenant computing system;
facilitating establishing restricted access for the created record and storing the restricted-access record in a tenant data store in the multi-tenant computing system such that a first subset of the credentialed users of the multi-tenant computing system may access the restricted-access record
providing a user access to the restricted-access record stored in the tenant data store using access credentials of a user in the first subset of users;
facilitating generation of a note associated with the record, the note having restricted access that is different from the restricted access of the record that corresponds to a second subset of the credentialed users of the multi-tenant computing system;
facilitating access to the restricted-access record using access credentials of a user in the second subset; and
displaying the record on the display with the note displayed over the record if the access credentials allow for access to both the restricted-access record and the note.

17. The non-transitory computer-readable medium of claim 16, wherein the restricted access of the record comprises a restriction of access to users of the tenant data store who have the access credentials corresponding to the record.

18. The non-transitory computer-readable medium of claim 16, wherein the restricted access of the note comprises a restriction of access to users of the tenant data store who have access credentials assigned by a note generating user.

19. The non-transitory computer-readable medium of claim 16, further comprising computer-executable instructions for:
accessing the note after the note is generated; and
changing the restricted access of the note.

* * * * *